Patented Apr. 17, 1945

2,373,709

UNITED STATES PATENT OFFICE 2,373,709

COATING COMPOSITION AND METHOD OF MAKING SAME

William J. Rice, Brooklyn, N. Y.

No Drawing. Application December 30, 1941, Serial No. 424,902

4 Claims. (Cl. 106—219)

The present invention is directed to the treatment of tall oil and the like for the purpose of converting the same into products which are much more valuable than the starting material. More specifically, the present invention resides in a chemical treatment of the tall oil whereby it is converted into a material adapted for use in coating compositions and the like.

Tall oil is a liquid composition obtained as a by-product in the treatment of wood pulp by the sulphate method, and it consists essentially of a mixture of various fatty acids having from 12 to 16 carbon atoms, some being liquid and others being solid, together with resin acids in substantial proportions, and some organic unsaponifiable matter. Tall oil is a cheap product, but its properties are such that it is quite difficult to make any important commercial application thereof without expensive chemical operations.

It has heretofore been proposed to esterify tall oil with glycerine in order to improve its properties, and it has also been proposed to esterify the same in the presence of phthalic anhydride or similar acid to form resinous materials. However, such resins are often soft and very dark colored, do not have satisfactory drying properties and are relatively expensive for use in certain liquid coating compositions.

It has also been proposed to purify the tall oil by various treatments of chemical and physical nature so as to separate the resin acids from the fatty acids. Such processes include one in which the mixture was treated with an esterifying material which would combine only with the fatty acids present, and then the resin acids were esterified with a different type of agent, which would be selective only to the resin acids. Thereafter, a fractional distillation was made which was intended to separate one group of esters from the other group. Such a process, while operative to give some results, was impractical commercially for various reasons.

The present invention has among its objects, the treatment of tall oil by a simple and direct chemical procedure for the purpose of refining the same and to convert the same into a highly useful product.

It is also among the objects of the present invention to convert the tall oil into a material which has drying properties and thus may be used in coating compositions to form air-drying and baked films. Thereby the present invention makes available a cheap raw material which has improved properties and is capable of wide-spread use.

A further object of this invention is to produce a composition which is a drier and which may be added to coating compositions to accelerate the drying thereof.

In practicing the present invention the tall oil, containing a relatively large proportion of resin acids, is treated with lime either at ordinary temperatures, or preferably at elevated temperatures in order to cause a reaction to take place. Usually the amount of lime is so large that if it were used to combine with resin acids, gelling thereof would take place. However, in accordance with the present invention, no gelling results and the final product is fully soluble in various organic solvents. To the product is added a drier and the same may be used similarly to previously known coating compositions having drying properties, with good results.

The following examples will illustrate the nature of the present invention, without limiting the scope thereof.

Example I.—200 parts by weight of tall oil are mixed with 8 parts by weight of burnt lime, a ratio of about 10 parts of lime relative to the rosin present in said tall oil. The mixture is heated slowly with constant stirring to avoid excessive foaming during the reaction, the temperature being gradually raised over a period of several hours to 500° F. Heating is continued at about this temperature for such a period of time until a small sample taken from the reaction mass hardens upon chilling in water. The heat is then removed and the mass is allowed to cool to about 400° F. 89 parts by weight of mineral spirits then are added thereto and incorporated thoroughly therein by continued stirring in order to dissolve the reaction product.

To the product is added a small amount of a suitable drier of well-known type, and the composition may be used as such for coating compositions. It has an amber color and gives a natural finish, but if desired, suitable fillers, pigments, modifiers and the like, may be added thereto.

Example II.—A mixture is made of 290 parts by weight of tall oil, 140 parts of rosin and 38 parts of lime, a ratio of about 15 parts of lime relative to the rosin present in the mixture. The mixture is heated slowly to a temperature of 290° F., the rate of heating being so chosen as to prevent excessive foaming and too rapid reaction in the mixture. The foaming results from the evolution of water vapor during the interaction at the elevated temperatures and the tendency of the relatively viscous, anhydrous mass to retain said vapors. The foaming and reaction diminish after this temperature is reached and further heating to 400° F. may be at a higher rate. The reaction mass is maintained at the latter temperature for a sufficient length of time so that a test drop, when placed on a glass plate and chilled, becomes hard. The reaction to form the desired product requires from one-half to one hour. There is then added to the reaction product, 198 parts by weight of mineral spirits which is incorporated with the product to form a clear solution.

143 parts by weight of the above solution is used to make a drying composition. To this is added 10 parts by weight of a cobalt drier containing about 6% of metal and 2.4 parts by weight of a manganese drier also containing about 6% of metal. The composition is brushed on a suitable surface and allowed to dry. In 24 hours the air-drying is substantially complete.

The present invention is based on the discovery that rosin may be treated with lime in large amounts, to give a hard resin which is soluble, and which does not gel, by introducing into the reaction mixture a substantial quantity of tall oil. The latter usually contains about 40% of rosin acids and about 53% of higher fatty acids, and preferably sufficient rosin is used so that the rosin is the major constituent of the mixture. The amount of lime as set forth in Example 2 is several times that which could be used to react with the rosin alone, being over 15%. The lime accomplishes the desired purpose of reducing the acidity of the tall oil to a point sufficiently low, so that it may be used for coating compositions, and at the same time produces a product which is sufficiently hard so that the film formed therewith is of a suitable degree of toughness for commercial use. Because the products obtained by the present invention are clear without suspended matter therein, they are adaptable for clear varnishes and the like. The presence of even much larger amounts of lime in the product as in Example II, is no detriment in that there is no tendency for the mixture to gel during the heating, and the presence of the large amount of lime insures the hardness of the final film.

The chemical reactions which occur in the present invention are not fully understood. It may be that in the treatment of the tall oil with the lime, a reaction between resin and fatty acids takes place perhaps simultaneously with the reaction with lime to form compounds which do not gel, contrary to the results obtained when resin and fatty acids are separately treated with lime. It seems to be necessary in the present invention to have a mixture of resin and fatty acids present, and it is likely that interaction takes place with the formation of mixed or complex esters, and probably reactions between two or more of the acids or esters present, resulting in resinification of the mass. It may, therefore, be possible, to provide an artificial mixture for the treatment with lime. For instance, a mixture may be made of linseed oil, the fatty acids of linseed oil, rosin, and lime, and a reaction caused to occur at elevated temperatures, under pressure, if desired. Other glyceride oils and fatty acids from animal, fish or vegetable sources may be used.

If, in place of the calcium described above, a metal having drying properties be used, driers may be obtained. Accordingly, the procedure may be conducted with the use of suitable compounds of lead, cobalt, manganese, vanadium, and the like, whereby a drier is formed, which may be dissolved in organic solvents or used per se in coating compositions.

Although the present invention has been described with the two examples given above, it is understood that the invention is not limited either to the exact compositions used or to the ingredients thereof. The invention is broader than the specific examples and the proportions may be varied within wide limits; the various ingredients may be replaced in whole or in part by substances having similar properties, and the exact course of the operation may be varied at will in accordance with the knowledge of those skilled in the art. It is not necessary that lime be used as the neutralizing agent. Compounds of other metals such as zinc oxide, magnesium oxide, barium oxide and others may be substituted for the lime. In place of oxides, organic and inorganic salts of the metals may be used, which salts are capable of reacting with the tall oil to give the desired results. It is not essential to add resin acids to the composition since the tall oil already contains a considerable proportion thereof. When such resin acids are added, there are available other resins than rosin for the purpose. Other compositions may be used in place of tall oil, as for instance, rosin oil, commonly termed kidney oil, may be substituted in part or in whole for the same.

The compositions set forth above were intended to be used for air-drying films. However, such compositions are equally suitable as baking enamels or as japan varnishes. They may be incorporated with other compositions or ingredients to form various types of coating compositions. The compositions of the present invention may be used as a base which may be cooked with drying oils in order to form a varnish base or drying japan. Various dyes and pigments may be added to the compositions as desired, in accordance with well-established practice, and other solvents than mineral spirits may be used in conjunction therewith or in place thereof. Heating to cause a reaction to take place is not essential in all cases, provided that sufficient time is allowed for the reaction to be completed.

These and other changes may be made in the details of the invention, which is to be broadly construed and not to be limited except by the claims appended hereto.

What is claimed is:

1. A liquid coating composition containing as the essential film-forming constituents the reaction product of a mixture of rosin and tall oil with lime, the amount of lime present being from about 10 to 15% of the rosin in the mixture, the product having been formed by heating tall oil and lime together with gradually rising temperatures above the boiling point of water and up to 290°–500° F. over a period of several hours, said product being ungelled and being a hard solid, dissolved in an organic solvent.

2. A method of making a reaction product adapted for liquid coating compositions which comprises providing a mixture of rosin and tall oil with an amount of lime which is about 10 to 15% of the rosin in the mixture, heating said mixture with gradually rising temperature above the boiling point of water and up to 290°–500° F. for several hours, and continuing the reaction until a hard product is formed.

3. A resinous reaction product of a mixture of rosin and tall oil, the major constituent thereof being rosin, with lime in an amount which is 10 to 15% of the rosin in the mixture, said product being a hard resin, being ungelled, and soluble in organic solvents.

4. A resinous reaction product of a mixture of rosin and tall oil in the proportion of about 1 to 2, the major constituent thereof being rosin, with lime in an amount which is 10 to 15% of the rosin in the mixture, said product being a hard resin, being ungelled, and soluble in organic solvents.

WILLIAM J. RICE.